United States Patent [19]

Block

[11] 4,380,350

[45] Apr. 19, 1983

[54] TRUCK BOX TARPAULIN ASSEMBLY

[76] Inventor: Gordon Block, Box 265, Leroy, Saskatchewan, Canada, SOK 2PO

[21] Appl. No.: 221,900

[22] Filed: Dec. 31, 1980

[51] Int. Cl.³ .............................................. B00J 11/00
[52] U.S. Cl. .............................................. 296/98
[58] Field of Search ............... 296/98, 100; 16/110 R

[56] References Cited

U.S. PATENT DOCUMENTS

| 2,976,082 | 3/1961 | Dahlman | 296/98 |
| 3,384,413 | 5/1968 | Sargent | 296/98 |
| 3,829,154 | 8/1974 | Becknell | 296/98 |
| 4,302,043 | 11/1981 | Dimmer et al. | 296/98 |

*Primary Examiner*—Robert R. Song

[57] ABSTRACT

A tarpaulin is held by one edge along one side of the truck body and is rolled on a longitudinally extending roller assembly so that when the roller assembly is rotated, the tarpaulin rolls across the top of the truck box transversely. Spring loaded check cables extend from the ends of the roller and are fastened to the truck body on the other side of the truck body to control the roller and tarpaulin as the roller is being rotated to cover and uncover the top of the box.

4 Claims, 7 Drawing Figures

TRUCK BOX TARPAULIN ASSEMBLY

BACKGROUND OF THE INVENTION

This invention relates to new and useful improvements in truck box tarpaulin assemblies.

Conventional truck boxes having open tops often require covering when transporting perishable loads such as grain or dust producing loads such as sand, gravel and the like. In fact, many jurisdictions require such loads to be covered during the transportation thereof and many attempts have been made to produce a truck tarpaulin which is readily and easily installed and which is easily operated by one man.

While it is possible to lash tarpaulins securely to the truck sides, this is time consuming so that many mechanical rolling assemblies have been produced to roll and unroll the tarpaulin across the top of the truck.

These mechanical devices usually require trucks upon which the tarpaulin rolls by rollers or the like and are usually relatively involved and expensive to produce and install.

SUMMARY OF THE INVENTION

The present invention overcomes all of these disadvantages by providing a relatively simple tarpaulin assembly which is easily rolled across the top of the truck box to cover or uncover the interior thereof and one aspect of the invention consists of a tarpaulin cover assembly for the open upper side of the truck box which includes a pair of side walls, a rear end wall, and a front end wall; said tarpaulin cover assembly comprising in combination a substantially rectangular tarpaulin adapted to cover the open upper side of the truck box when in the fully extended position, means to fasten one longitudinal edge of the tarpaulin to one side wall, longitudinally extending roller means engaging the other longitudinal edge of said tarpaulin and means to rotate said roller means, said roller means being supported for transverse rolling motion upon the upper edges of the front and back end walls of the truck body, and means operatively extending between said roller means and said truck body to tension said tarpaulin transversely at all times, including a cable and spring assembly secured upon each of the end walls of said truck box, said roller assembly including a cable drum at each end thereof to receive the cable of said cable and spring assembly and means to secure said cables one to each of said cable drums, said means to rotate said roller means including a handle secured to said roller means at least at one end thereof, a crank pin extending from said handle adjacent the distal end thereof, an elongated actuating member pivotally secured by one end thereof to said crank pin for rotating said handle of said crank pin and means detachably securing said distal end of said handle to said end wall to secure said tarpaulin in the desired position against pressure of said springs.

Another advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
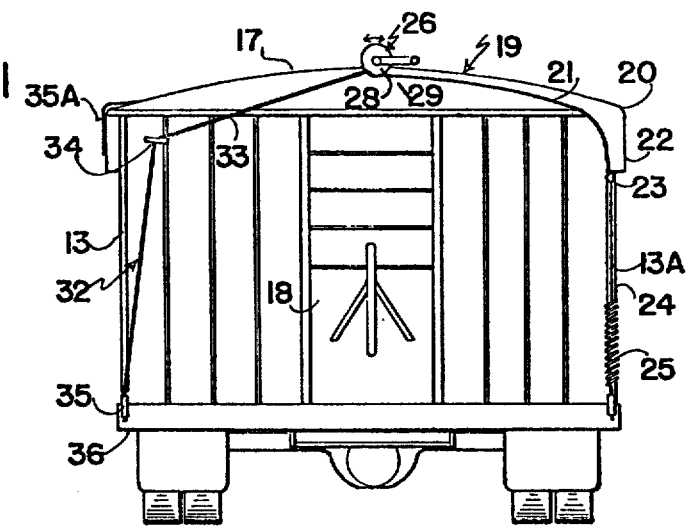
FIG. 1 is a fragmentary side elevation of a truck and truck box showing the tarpaulin assembly in the fully closed position.

Proceeding therefore to describe the invention in detail, reference character 10 illustrates a conventional truck having a body collectively designated 11 thereon and mounted upon ground engaging wheels 12 in the usual manner. The truck box includes sides 13 and 13A, a front end wall 14 and a rear end wall 15 which, together with a floor 16, defines a truck box having an open upper side 17. The rear end of the truck box is usually provided with access door 18 in the usual way.

The tarpaulin assembly is collectively designated 19 and consists of a substantially rectangular tarpaulin or canvas cover 20, the dimensions of which are sufficient to permit the edges 21 of the tarpaulin to overlap the upper sides of the walls of the truck box, thus providing an efficient seal.

Means are provided to secure one longitudinal edge 22 of the tarpaulin to one side 13A of the truck box. Said means may take the form of fastening the edge to adjacent the upper edge of the side wall 13A by means of screws or the like or, alternatively, a bar or batten 23 may be secured to and extend along the edge of the tarpaulin and be held in position by means of cables 24 and tension springs 25 extending downwardly from the batten to adjacent the lower end of the side wall 13A to which they are fastened.

The other longitudinally extending edge of the tarpaulin is secured to a roller assembly collectively designated 26, this roller assembly including a roller 27 extending longitudinally of the truck box and extending beyyond the front and rear end walls 14 and 15 thereof. The aforementioned other longitudinal edge 22A of the tarpaulin is secured to the roller by any conventional means such as nails, screws, staples or the like and a cable drum 28 is secured to each end of the roller beyond the end walls 14 and 15 thereof.

Figure 2:
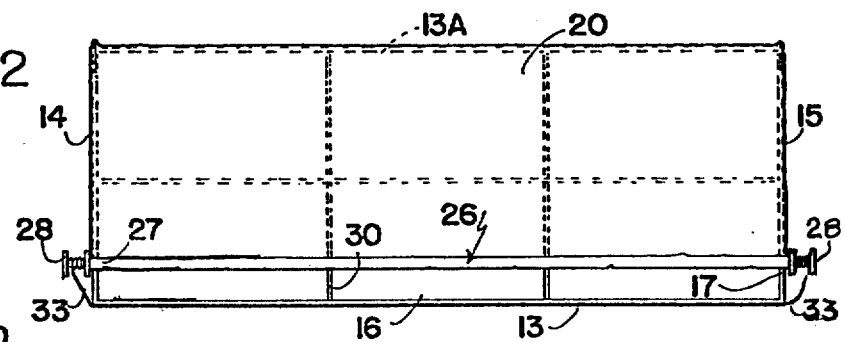
FIG. 2 is a rear end view of FIG. 1, but showing the tarpaulin assembly in the partially uncovered position.
Figure 3:
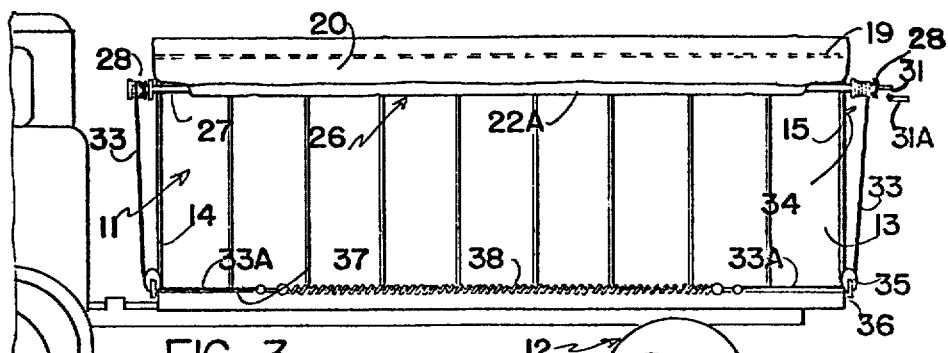
FIG. 3 is a top plan view of the truck box per se, with the tarpaulin assembly partially open.

The roller 27 is adapted to roll on the upper edges of the end walls 14 and 15 which are preferably shaped as shown in FIG. 2 with each side inclining upwardly towards a central apex area 29 lying along the longitudinal axis of the truck body.

If desired, transverse supports 30 shaped in a similar manner, may extend between the upper edges of the side walls 13 and 13A intermediate the ends thereof.

These may be detachable and the number will depend upon the length and width of the truck box.

Means are provided to rotate the roller assembly and take the form, in this embodiment, of handle crank 31 secured to one end of the roller 27, preferably the end adjacent the rear end wall 15 of the truck body and this crank may be rotated manually preferably utilizing a pull rod (not illustrated) the distal end of which may engage the portion 31A of the handle crank. From the foregoing, it will be appreciated that rotation of the handle crank 31 will cause the roller assembly to roll along the upper edges of the end walls, rolling the tarpaulin onto the roller 27 as it moves from side wall 13 towards side wall 13A and viceversa.

However, it will also be appreciated that means are required in order to tension the tarpaulin not only during the rolling action, but also when the tarpaulin is in the extended or covering position, said means being collectively designated 32 and taking the form of a cable and spring assembly.

A pair of cables 33 are secured by one end thereof, one to each of the cable drums 28 and extend through sheaves 34 and 35. The sheaves 34 are situated one on the front wall 14 and another on the rear wall 15, and adjacent the upper corner 35A of the junction between the end walls and the side wall 13.

The other sheaves 35 are situated one upon each end of the side wall 13 adjacent the lower corners thereof, said sheaves preferably being universally mounted so that they are self-aligning. However, structures such as these are well known and it is not believed necessary to describe same further.

These sheaves 34 and 35 guide the other ends 33A of the cables towards one another along adjacent the lower longitudinally extending edge 37 of the side wall 13 and a relatively long coiled tension spring 38 or the equivalent, extends between the ends of the cables thus applying equal tension thereto. It will be noted that the sheaves 34 guide the cables towards the cable drum and supply transverse tension to the tarpaulin regardless of the position thereof. As the roller assembly is rolled towards the wall 13A, the spring 38 extends thus maintaining the tension upon the tarpaulin and also maintaining the alignment of the roller assembly.

The spring 38 is also provided with sufficient tension to maintain the tarpaulin assembly in the fully closed position illustrated in FIG. 1 as well as assisting in the tensioning and alignment thereof during the rolling and unrolling operation.

FIGS. 4 to 7 show the preferred embodiment and where similar parts are used, similar reference characters have been given.

Figure 4:
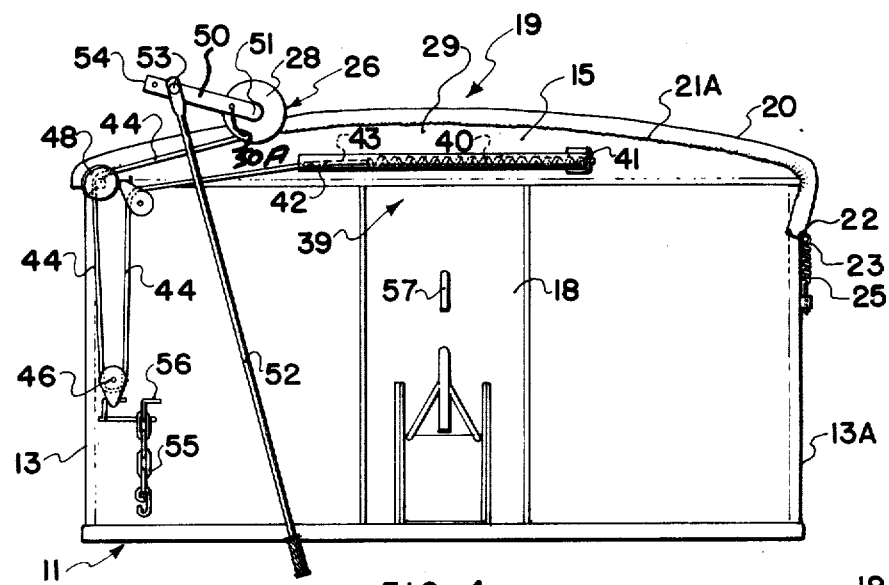
FIG. 4 is an end view of the preferred embodiment showing the tarpaulin partially opened.

It will be noted firstly, that the rear edge 21A of the tarpaulin and, the front edge (not illustrated) are elasticized to ensure a good fit of the tarpaulin over the front and rear upper edges of the end walls 14 and 15. Secondly, a cable and spring assembly collectively designated 39 are provided in this embodiment, at the rear wall 15 above the discharge gate 18 and situated transversely as illustrated in FIG. 4. It is preferable that the tension spring 40 be anchored by one end thereof to one end 41 of the spring carrying tube 42 which in turn is secured to the rear wall 15. The upper end 43 of the cable 44 is secured to the distal end of the spring within the tube 42. This cable, which is secured by the other end thereof to the cable reel 26, is guided by a universally mounted sheave 45 secured to the rear wall 15 adjacent the upper side thereof, a further universally mounted sheave 46 also secured to the rear wall 15 and situated spaced below the first sheave 45, and a roller or guide pin 47 situated substantially level with the first sheave 45 but outboard thereof with a circular guard plate 48 being secured to the outer end of the spindle 49 mounting the roller 47. The cable then extends to the cable drum 26 and is secured thereto as hereinbefore described.

Means for operating the roller assembly are provided consisting of a handle 50 secured by one end thereof to the end 51 of the spindle carrying the roller assembly and to the drum by means of pin or bolt 50A. An actuator 52, taking the form of an elongated rod, is pivotally secured by the inner end thereof to a crank pin 53 secured to and extending outwardly from the handle 50 adjacent the distal end 54 thereof. This enables the handle together with the roller assembly, to be rotated as hereinbefore described.

The device operates in a manner similar to that hereinbefore described with the spring 40 supplying tension transversely to the canvas or tarpaulin at all times. However, it should be noted that roller or guide pin 47 acts as a guide to the cable drum 26 as it changes direction when passing around the upper side of the side 13 of the truck body. To facilitate engagement of the cable drum with the roller, the upper portion of the disc 48 is flanged outwardly at an angle to the plane of the disc as shown in FIG. 5.

When it is desired to lock the canvas or tarpaulin in the fully closed position, the distal end 54 of the handle is locked to the rear wall by means of a short length of chain 55 engaged by one end thereof to the distal end 54 of the handle 50 and by the other end thereof to a hook 56 secured to the rear wall 15 of the truck body and offstanding slightly therefrom.

Figure 5:
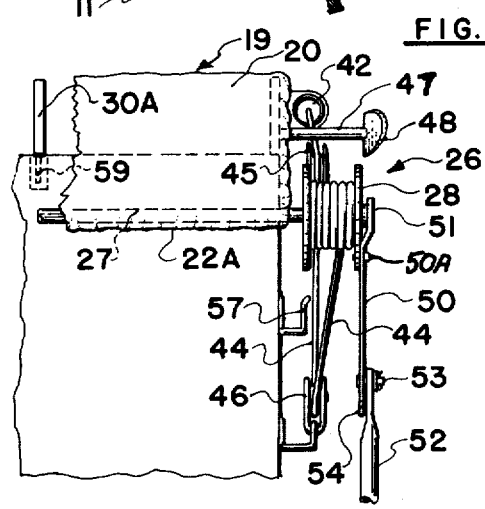
FIG. 5 is a fragmentary side view of FIG. 4 taken from the left-hand side thereof.
Figure 6:
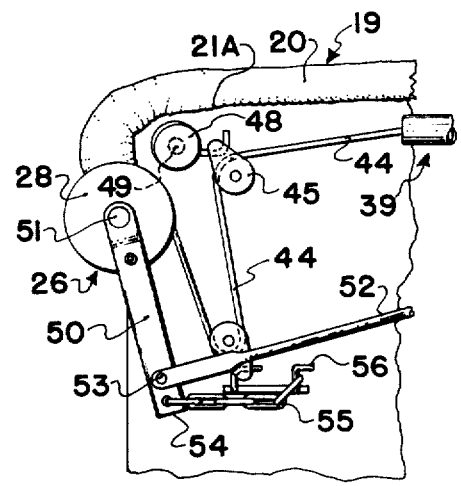
FIG. 6 is a fragmentary end view similar to FIG. 4, but showing the tarpaulin in the fully closed position.

Under these circumstances, the actuator 52 is pivoted to the substantially horizontal position and rested in a hook 57 secured to the rear wall as shown in FIGS. 4 and 5.

It will be appreciated that the cable and spring assembly together with the sheave assemblies and roller described for the rear wall, are also present on the front wall so that even tension is maintained at all times.

Figure 7:
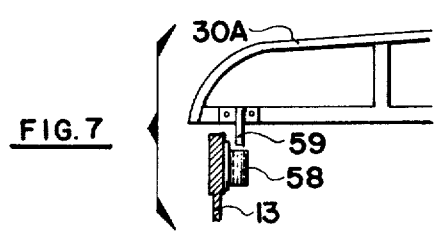
FIG. 7 is an exploded fragmentary partially cross sectioned view showing the preferred method of inserting the additional supports.

FIG. 7 shows one construction of the additional supports 30A which are detachably securable across the truck body adjacent the upper edges of the side walls thereof. Relatively small tubes 58 are secured to the inner surface of the upper edge of the truck body side walls and the members 30A are provided with pins or spigots 59 depending from the underside thereof which slidably engage within the tubes or sockets and can be removed when necessary.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. A tarpaulin cover assembly for the open upper side of a truck box which includes a pair of side walls, a rear end wall, and a front end wall; said tarpaulin cover assembly comprising in combination a substantially rectangular tarpaulin adapted to cover the open upper side of the truck box when in the fully extended position, means to fasten one longitudinal edge of the tarpaulin to one side wall, longitudinally extending roller means secured to the other longitudinal edge of said tarpaulin and means to rotate said roller means, said roller means being supported for transverse rolling motion upon the upper edges of the front and back end walls of the truck body, and means operatively extending between said roller means and said truck body to tension said tarpaulin transversely at all times, said means operatively extending between said roller means and said truck body to tension said tarpaulin transversely at all times including a cable and spring assembly secured upon each of the end walls of said truck box, said roller assembly including a cable drum at each end thereof to receive the cable of said cable and spring assembly and means to secure said cables one to each of said cable drums, said means to rotate said roller means including a handle secured to said roller means at least at one end thereof, a crank pin extending from said handle adjacent the distal end thereof, an elongated actuating member pivotally secured by one end thereof to said crank pin for rotating said handle of said crank pin and means detachably securing said distal end of said handle to said end wall to secure said tarpaulin in the desired position against pressure of said springs.

2. The invention according to claim 1 in which the end and side edges of said tarpaulin overlap the upper edges of the walls of said truck body when fully extended over said open upper side.

3. The invention according to claim 1 in which each of said cable and spring assemblies includes a cable secured by one end thereof to the adjacent cable drum, means secured to each of said end walls for guiding the relevant cable, said last mentioned means each including a cable guide secured adjacent to the upper side of said end wall and adjacent to said other side wall, a further cable guide secured to said end wall between said first mentioned cable guide and a third cable guide secured to said end wall outboard of said first mentioned cable guide, said cable guides guiding the other ends of said cables towards the spring of said cable and spring assembly, said other end of said cable being secured to the distal end of said spring.

4. The invention according to claim 2 in which each of said cable and spring assemblies includes a cable secured by one end thereof to the adjacent cable drum means secured to each of said end walls for guiding the relevant cable, said last mentioned means each including a cable guide secured adjacent to the upper side of said end wall and adjacent to said other side wall, a further cable guide secured to said end wall between said first mentioned cable guide and a third cable guide secured to said end wall outboard of said first mentioned cable guide, said cable guides guiding the other ends of said cables towards the spring of said cable and spring assembly, said other end of said cable being secured to the distal end of said spring.

* * * * *